Aug. 17, 1943.   J. A. DEUBEL ET AL   2,326,767
CONTROL SYSTEM
Filed July 17, 1940
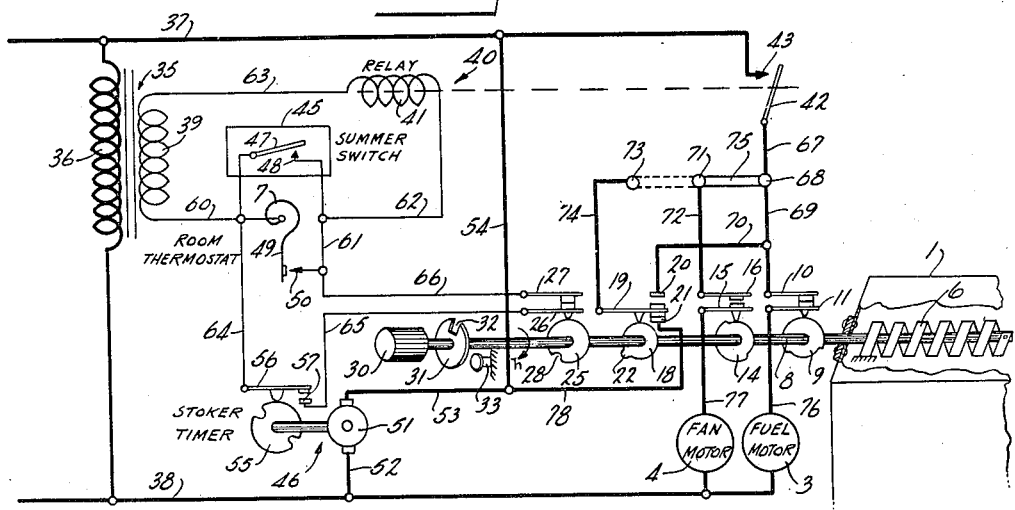
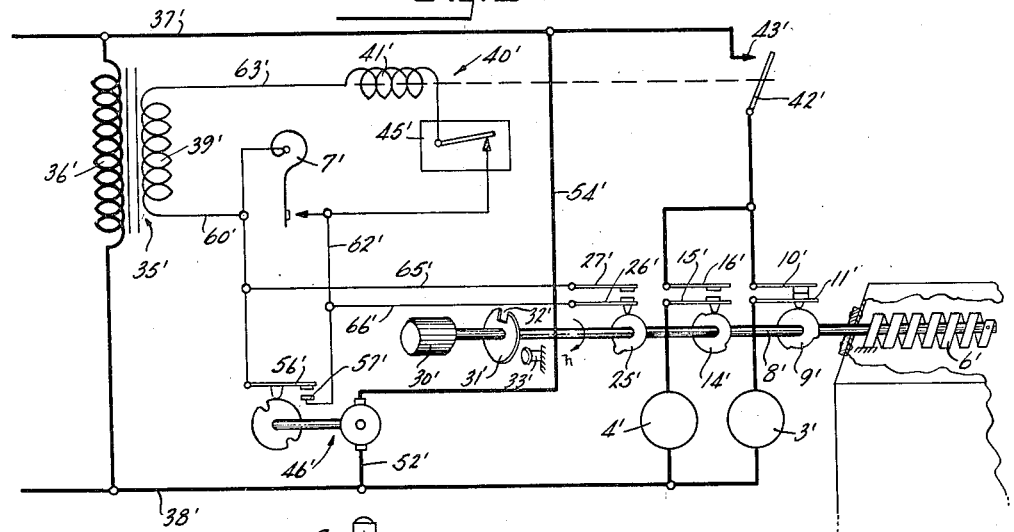
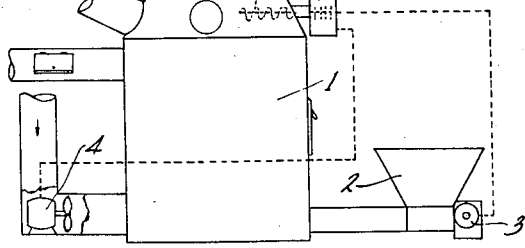
INVENTORS:
Justin A. Deubel
Wayland R. Miller
BY
ATTORNEY.

Patented Aug. 17, 1943

2,326,767

UNITED STATES PATENT OFFICE 2,326,767

CONTROL SYSTEM

Justin A. Deubel, Milwaukee, and Wayland R. Miller, Whitefish Bay, Wis., assignors to Perfex Corporation, Milwaukee, Wis., a corporation of Wisconsin Application July 17, 1940, Serial No. 345,914

12 Claims. (Cl. 236—9)

This invention relates in general to automatic controls and more particularly to automatic control systems for stoker fired warm air heating systems.

It has become common in the art to make provision for operating the fan or air circulating means of warm air heating systems during both summer and winter. During the heating season the fan is usually controlled so as to operate when the burner or stoker for the furnace is in operation. Usually the fan is controlled by a thermostat responsive to the temperature in the bonnet of the heater so as to prevent operation of the fan whenever the delivery temperature of the air would be too low for comfort. In the summer, control of the fan is by a summer-winter switching mechanism transferred to a manual switch located at a suitable point so that the occupants may operate the fan at will. In the case of stoker fired systems, the stoker is usually provided with a timer or other fire maintaining device which operates the stoker at intervals independently of the thermostat for preventing the fire from going out in mild weather. In such systems, heretofore, a rather complicated wiring arrangement utilizing a plurality of relays has been required in order to maintain the stoker control circuits separate from the fan control circuits, this being necessary in order to prevent the stoker timer from exerting a controlling influence on the fan.

It is an object of the present invention to provide a simplified control arrangement for controlling systems of the type above mentioned. More specifically, an object of this invention is the provision of a control system utilizing a control circuit controlled either directly or indirectly by a thermostat and a stoker timer or fire maintaining means, which control circuit in winter controls the stoker and circulating means and which in summer controls only the circulating means, a changeover means being provided for obtaining the desired changeover and rendering the stoker timer or fire maintaining means inactive in summer to prevent operation of the circulating means thereby.

In the control of warm air systems having stoker fired furnaces, it is desirable to place the fan out of operation at the same time that the stoker is placed out of operation by the thermostat. This stops the supply of heat to the heated space at the time that the thermostat is satisfied and thus avoids any overrun in temperature due to continued supply of heat after the thermostat is satisfied. For many types of stoker installations this control sequence is quite satisfactory and this control sequence being preferable is utilized where possible. In some installations, however, this type of control sequence is not entirely satisfactory, as stopping of the fan prevents all circulation of air through the system. Due to the fact that the fire continues to burn at a fairly rapid rate for a period of time after the stoker is placed out of operation, the furnace becomes overheated with possible damage thereto. In systems having this characteristic, it is necessary to arrange the fan control so that the fan may operate as long as the furnace temperature is relatively high. Thus two different types of control systems having distinct sequences of operation have been required in order to provide proper control for all types of systems.

In providing controls for systems of this type, it is desirable to provide a single primary control which consists of the necessary relay, transformer, timing mechanism and other necessary instrumentalities, all located in a single housing. Due to the fact that two different wiring arrangements are necessary for providing the two sequences of operation, and as the wiring is located in the primary control unit, it has heretofore been necessary to carry in stock two types of primary control units, one type being wired for the first mentioned sequence of operation and the other type being wired for the second sequence of operation. This, of course, increases the number of primary control units carried in stock. In addition, where installations are made with one type of primary control where the other type of control should have been used, it is necessary for the service man to replace the control or to dismantle it in order to change the wiring.

It is a further object of the present invention to provide a control system utilizing a novel wiring arrangement wherein the sequence of operation of the system may be changed by simply shifting a selector member from one position to another.

Another object of this invention is the provision of a summer-winter control unit having a selector member as described above and which includes a summer-winter changeover means which in its summer position places the thermostat control circuit in control of the fan irrespective of the position of the selector member.

Other objects of the present invention lie in various combinations, subcombinations, and structures of control equipment, which will become apparent from the following description and the appended claims.

For a full disclosure of this invention reference is made to the following detailed description and to the accompanying drawing in which Fig. 1 illustrates diagrammatically a stoker fired warm air furnace having the controls of the present invention applied thereto;

Fig. 2 is a wiring diagram of one form of the invention and which illustrates diagrammatically the various control devices, and in which Fig. 3 illustrates a modification.

Referring to Fig. 1, reference character 1 indicates a warm air furnace of usual construction, this furnace being provided with a stoker 2 having a motor 3 and also being provided with a fan 4 which forces air to circulate through the return and discharge ducts of the usual warm air heating system. Installed in the bonnet of the furnace 1 is a primary control device, this device comprising control housing 5 mounted in any suitable manner upon the furnace. Extending rearwardly from the housing 5 into the bonnet of the furnace is a thermostatic element 6 which is preferably of helical construction. This primary control device is connected to the stoker motor 3, the fan 4 and to a room thermostat 7 as indicated.

Referring now to Fig. 2, this figure shows diagrammatically the control device located within the control housing 5 of the primary control, and also shows the wiring diagram for the system. The bimetallic element 6 is fixedly supported at one end and at its other is attached to a shaft 8. By this arrangement the shaft 8 is rotated by the element 6 upon change in bonnet temperature. The shaft 8 in the present embodiment of the invention carries a cam 9 which cooperates with a switch formed of contact blades 10 and 11 to form a limit switch controlling the operation of the stoker motor. The cam 9 is provided with a raised portion and a recessed portion as shown. This cam is mounted on the shaft 8 so as to maintain the switch blades 10 and 11 closed as long as the furnace or bonnet temperature is below a predetermined high value. As the bonnet temperature rises the thermostatic element 6 will rotate shaft 8 and cam 9 in a clockwise direction. When the bonnet temperature rises to the predetermined maximum value the switch blade 11 engages the recessed portion of the cam 9, thereby causing the switch blades 10 and 11 to disengage. The shaft 8 also actuates a cam 14 which cooperates with switch arms 15 and 16 to form a fan switch for controlling the fan motor. The cam 14 is likewise provided with a recessed portion and a raised portion. When the bonnet temperature is below a predetermined minimum value the switch blade 15 engages the recessed portion of cam 14 and thus disengages the switch arm 16. When the bonnet temperature rises to a value at which fan operation may occur without discomfort to the occupants of the building, the raised portion of the cam 14 engages switch arm 15 for urging it into engagement with the switch arm 16.

The thermostat shaft 8 also actuates a cam 18, which cam cooperates with a switch blade 19 adapted to selectively engage contacts 20 and 21. The cam 18 is provided with a raised portion 22. When the shaft 8 is rotated sufficiently to cause this raised portion 22 to engage the switch blade 19, this blade is urged into engagement with the contact 20. However, when the raised portion 22 of cam 18 is not in engagement with the switch blade 19, this switch blade engages the contact 21 as shown. The arrangement just described provides a circuit changeover switch, the purpose of which will become apparent as this description proceeds.

The thermostat shaft 8 also actuates a cam 25 which cooperates with switch blades 26 and 27 to form a timer control switch. The cam 25 is provided with a recessed portion 28 and is arranged on the shaft 8 so that this recessed portion 28 engages switch blade 26 at approximately the same time that the raised portion 22 of cam 18 engages switch blade 19. The thermostat shaft 8 is provided with a shaft 30 which permits this shaft to be manually rotated against the yielding action of the thermostatic element 6. A latch device is provided for retaining the shaft 8 in summer position. This latch member may consist of a disc 31 attached to the shaft 8, this disc 31 having a slot 32 adapted to engage a pin 33. By this arrangement the shaft 8 may be manually forced in a clockwise direction to a point at which the portions 22 and 28 of cams 18 and 25 engage their respective switch blades or followers. The shaft 8 may then be positioned inwardly so that the slot 32 of disc 31 engages the pin 33, this serving to hold the shaft 8 in summer position.

Reference character 35 indicates generally a transformer, the primary 36 of which is connected to line wires 37 and 38. This transformer includes a secondary coil 39 which is adapted to energize the relay generally indicated as 40. The relay 40 may be of any desired construction and is shown diagrammatically as comprising a pull-in coil 41 which actuates through a suitable armature a switch arm 42 cooperating with a contact 43. When the pull-in coil 41 is energized, the relay armature causes the switch arm 42 to be brought into engagement with contact 43. However, upon de-energization of coil 41 the switch arm 42 becomes disengaged from contact 43 due to the action of gravity or springs not shown.

The relay 40 is controlled by means of the room thermostat 7, a manual summer switch 45 and a stoker timer 46. The manual switch 45 may be of any desired type and is illustrated as comprising a movable switch arm 47 adapted to engage a contact 48. If desired, the switch 45 may be omitted, the control circuit being manually opened or closed in summer by operating the usual adjustment dial or lever of the room thermostat. The thermostat 7 likewise may be of any suitable type and is diagrammatically illustrated as comprising a bimetallic element 49 cooperating with a contact 50. The stoker timer, or fire maintaining means, may comprise a small synchronous motor 51 which is connected across line wires 37 and 38 by wires 52, 53 and 54. This motor 51 operates a cam 55 which cooperates with a switch arm 56 adapted to engage a contact 57. The cam 55 is provided with recessed portions which when engaging switch arm 56 permit this switch arm to engage contact 57. Thus rotation of cam 55 by the motor 51 causes switch arm 56 to engage contact 57 at predetermined intervals.

The various cam operated switches actuated by the thermostatic element 6 are located within the control housing 5. Preferably the transformer 35, relay 40 and stoker timer 46 are likewise located in the control housing 5 so as to provide a central control unit or primary control.

The thermostat 7 is located at any suitable location within the building, and similarly the summer switch 45 is located at a convenient point in the building so that the occupants can manually control the fan at will.

Referring now to the wiring arrangement, the secondary 39 of the transformer is connected by wire 60 to the element 49 of room thermostat 7. The contact 50 of this room thermostat is connected by wires 61 and 62 to the pull-in coil 41 of relay 40. The other end of this coil is connected by wire 63 to the secondary 39. Upon fall in space temperature to the predetermined value, the element 49 engages contact 50 which causes energization of relay pull-in coil 41 by the circuit above traced. The summer switch 45 is connected into this circuit in parallel relationship with the thermostat 7 as shown. Thus when this switch is closed the pull-in coil 41 is energized independently of the room thermostat 7. The switch arm 56 of the stoker timer is connected to wire 60 by wire 64 and the contact 57 is connected to the switch arm 26 of the timer control switch by wire 65. The switch arm 27 of this switch is connected by wire 66 to the wire 61. Thus when the timer control switch 26—27 is closed the stoker timer switch 56—57 periodically shunts the room thermostat 7 for energizing the relay 40 independently of thermostat 7.

The switch arm 42 of the relay 40 is connected by wire 67 to a jumper terminal 68 which is in turn connected by wires 69 and 70 to switch blade 10 of the limit switch and to contact 20 of the circuit changeover switch. A second jumper terminal 71 is connected by wire 72 to the switch blade 16 of the fan switch and a third jumper terminal 73 is connected by wire 74 to the switch arm 19 of the circuit changeover switch. A jumper 75 is provided and this jumper is adapted to be connected between either jumper terminals 68 and 71 as shown in full lines, or between jumper terminals 71 and 73 as shown in dotted lines.

*Operation*

For normal winter operation the shaft 8 is released from the restraining action of the latch 32—33 and is thus rotated by the thermostatic element 6 in response to changes in bonnet temperature. Also for normal winter operation, the summer switch 45 is in open position as shown. With the parts in the positions shown, the bonnet temperature is relatively low as indicated by the limit switch 10—11 being closed and the fan switch 15—16 being open. It will be noted that the cams 18 and 25 are so designed that switch arm 19 engages contact 21 and the switch 26—27 remains closed unless shaft 8 rotates to an extreme clockwise position. In other words, the rotation of the shaft 8 corresponding to maximum bonnet temperature is insufficient to cause cams 18 and 25 to actuate their respective switches from the positions shown. Assuming now that the room temperature falls to a value requiring heat, the switch arm 49 of the thermostat 7 will engage contact 50. This will complete an energizing circuit for the coil 41 of relay 40, thereby causing the relay switch arm 42 to engage contact 43. This will complete a circuit from line wire 37 through contact 43, switch arm 42, wires 67 and 69, switch blades 10 and 11 and wire 76 to the stoker or fuel motor 3, thereby placing the stoker into operation. Due to the fan switch 15—16 being open at this time, the fan will remain at rest. The operation of the stoker will in a short period of time cause the bonnet temperature to begin rising, thereby rotating the shaft 8 clockwise. When the bonnet temperature rises to a predetermined value the cam 14 will cause engagement of switch blades 15 and 16. This will complete a circuit from switch blade 42, wire 67, jumper 75, wire 72, and wire 77 to the fan motor, thereby placing the fan into operation. In the event that the bonnet temperature rises to the maximum predetermined value, the recessed portion of the cam 9 will engage the switch blade 11 for permitting this switch blade to disengage the switch blade 10, thereby opening the circuit to the motor 3. This will place the stoker out of operation until the bonnet temperature falls to a value at which the limit switch 10—11 again closes. It should be noted that the fan switch 15—16 remains closed so that the fan continues to operate even though the stoker is out of operation. When the room thermostat 7 becomes satisfied the element 49 will disengage contact 50, thus opening the circuit for coil 41 which causes the switch arm 42 to disengage contact 43. This de-energizes both the stoker motor and the fan motor. Due to the stopping of the fan motor, the forced circulation of air is discontinued and consequently the delivery of heat to the building is stopped, which prevents over-shooting of the room temperature. During the time when the room thermostat is satisfied, and therefore contacts 49 and 50 are open, the switch 56—57 of the stoker timer closing periodically serves to energize the relay 40 for brief intervals. This serves to keep the fire alive during mild weather when the room thermostat calls for heat only occasionally.

During the summer it is desirable to operate the fan without operating the stoker. For summer operation, the knob 30 is rotated clockwise and pushed in so that the slot 32 engages pin 33. For this position of the shaft 8 the limit switch 10—11 will be open, the fan switch 15—16 will be closed, the switch arm 19 will engage contact 20, and the timer control switch 26—27 will be open. During the summer the room temperature will be above the control point of the room thermostat 7 and consequently the element 49 thereof will be at all times disengaged from contact 50. When it is desired to operate the fan, the summer switch 45 is manually closed, which energizes the relay 40. Engagement of the switch arm 42 with the contact 43 will now cause energization of the fan motor due to the fact that the fan switch 15—16 is now in closed position. However, the stoker motor 3 will not be energized due to the fact that the shaft 8 is now positioned for opening the limit switch contacts 10—11. When the summer switch 45 is opened the relay 40 will become de-energized for stopping the fan. It should be noted that during the summer the stoker timer is prevented from energizing the relay coil 41 by the timer switch 26—27 which is now open.

In some cases it is not feasible to control the fan by the relay during normal winter operation. This is true in installations where an overheating of the furnace might occur due to stopping of the fan at the same time that the stoker is placed out of operation. In order to provide proper control for systems having such characteristics the jumper 75 is shifted from its full line position to its dotted line position. With this position of the jumper 75, the fuel motor 3 will continue to be energized in the same manner as it was when the jumper was in the full line position but the mode of operation of the fan will be changed. Now when the bonnet temperature rises to a point for closing the fan switch 15—16, the fan motor 4 will be energized as follows: Line wire 37, wire 54, wire 76, contact 21, switch blade 19, wire 74, jumper 75, wire 72, switch blade 16, switch blade 15 and wire 77 to the fan motor 4. It will be noted that the energizing circuit for the fan motor 4 is now entirely independent of the relay 40. Consequently when the relay 40 is de-energized the fan will continue to run until the bonnet temperature falls to the value at which the fan switch 15—16 opens.

When the shaft 8 is rotated by the summer changeover knob 30 to its summer position, the switch blade 19 disengages contact 21 and engages contact 20. The disengagement of the switch blade 19 from contact 21 breaks the separate energizing circuit to the fan motor and engagement of switch blade 19 with contact 20 places the fan motor under the control of the relay 40. Now when the relay 40 is energized by the manual switch 45 during the summer, the fan motor 40 is energized by a circuit as follows: Line wire 37, contact 43, relay switch arm 42, wires 67 and 69, wire 70, contact 20, switch blade 19, wire 74, jumper 75, wire 72, switch blade 16, switch blade 15 and wire 77 to the fan motor.

From the foregoing description it will be apparent that the present invention provides a simple arrangement for controlling the fan of a stoker fired warm air heating system, the invention providing for preventing interference by the usual stoker timer with the operation of the fan during summer operation of the system. It will also be apparent that the present invention provides for readily changing the control sequence so as to either stop the fan simultaneously with the stoker motor or to permit it to continue to run until the furnace becomes cool. It will also be apparent that the present invention provides a simple arrangement by which summer control of the fan is obtained from a summer switch regardless of which type of control sequence is provided.

*Figure 3*

Referring now to Fig. 3, this figure shows a modified arrangement by which the relay may be controlled by a manual switch in the thermostat control circuit without interference by the stoker timer. In this figure the jumper arrangement for providing circuit changeover has been omitted. The various parts in Fig. 3 corresponding to like parts in Fig. 2 have been indicated by the same reference characters primed.

In Fig. 3 the summer switch 45' instead of being a normally open switch in parallel with the room thermostat as in Fig. 2, is a normally closed switch located in the wire 62' between the thermostat 7' and the relay coil 41'. It will be apparent that when the thermostat 7' calls for heat with the summer switch 45' closed, the relay coil 41' will be energized for causing the switch arm 42' to engage contact 43'. This will cause energization of the fuel motor 3' and later energization of the fan motor 4' in the same manner as in Fig. 2. When the room thermostat 7' is satisfied, the relay 40' will be de-energized for placing the fan and stoker motor out of operation. The stoker timer 46' at this time, by periodic engagement of switch arm 56' with contact 57', will complete a circuit shunting the room thermostat 7' for causing occasional operation of the stoker for maintaining the fire alive.

In order to change over the system to summer control, the changeover knob 30' is rotated clockwise for causing the slot 32' to engage pin 33'. This position of the shaft 8' causes opening of the limit switch 10'—11' for preventing operation of the stoker motor 3' and causes closing of the fan switch 15'—16' for placing the fan motor 4' under the control of the relay 40'. When the shaft 8' is in its summer position, the raised portion on the cam 25' causes the switch blade 26' to engage blade 27'. This provides a permanent shunt around the room thermostat 7' and the stoker timer 46'. The pull-in coil 41' of the relay will now be energized as follows: Transformer secondary 39', wire 60', wire 65', switch 27'—26', wire 66', wire 62', summer switch 45', pull-in coil 41' and wire 63' to secondary 39'. By opening and closing the summer switch 45' the fan may be stopped and started. Inasmuch as the switch 56'—57' of the stoker timer is shunted at all times during summer operation, this timer has no effect upon the fan. By operating the knob 30' so that the slot 32' is released from the pin 33', the system is returned to normal winter operation.

While we have shown and described but two specific embodiments of the invention, it will be understood that the invention may take many other forms. For example, while we prefer to provide summer-winter changeover by rotation of a thermostat shaft, the same results can be obtained by utilizing separate switches connected in series or parallel into the circuit as required. Also, while the invention has particular utility in controlling systems wherein a stoker timer is employed, the invention is not limited thereto as certain features thereof have utility wherein other types of fire maintaining means are utilized or in systems where a fire maintaining means is not required as in oil or gas fired heating systems. In addition, while the invention is provided especially for controlling stoker fired warm air heating systems having a fan, certain features of the invention are applicable to other types of air conditioning systems, for example, to hot water heating systems having circulators. Inasmuch as many changes may be made without departing from the scope of the present invention, it is desired to be limited only by the scope of the appended claims.

What is claimed is:

1. In a control system for a space conditioning system including heating means having a stoker and mechanical circulating means for circulating heat exchange medium from said heating means to said space, the combination of, a relay having first and second positions and connected to said stoker and circulating means in a manner tending to place both into operation when the relay is in its first position and to place both out of operation when the relay is in its second position, a control circuit for said relay including a thermostat for causing said relay to assume its first position upon demand for heat in the space and for causing it to assume its second position when the demand for heat is satisfied, fire maintaining means also connected to said relay in a manner causing it to assume its first position at times independently of said thermostat for maintaining the fire alive, summer-winter changeover means operative in its summer position to prevent said relay from placing the stoker into operation while leaving said relay in control of said circulating means, and means controlled by said summer-winter changeover means in its summer position for preventing said fire maintaining means from influencing said relay.

2. In a control system for a space conditioning system including heating means having a stoker and mechanical circulating means for circulating heat exchange medium from said heating means to said space, the combination of, a relay having first and second positions and connected to said stoker and circulating means in a manner tending to place both into operation when the relay is in its first position and to place both out of operation when the relay is in its second position, a control circuit for said relay including a thermostat for causing said relay to assume its first position upon demand for heat in the space and for causing it to assume its second position when the demand for heat is satisfied, a heater thermostat influenced by the temperature of the heating means for preventing operation of the circulating means when the temperature of the heating means is low while permitting operation of the circulating means under the control of the relay when said temperature is high, fire maintaining means including a switch connected to said relay for causing it at times to assume its first position independently of said thermostat for thereby maintaining the fire alive, summer-winter changeover means operative in its summer position to prevent operation of said stoker by said relay and to render said heater thermostat ineffective to prevent operation of the circulating means to thereby place the relay control circuit in control of said circulating means, and means controlled by said summer-winter changeover means in its summer position for preventing said fire maintaining means from causing actuation of said relay.

3. In a control system for a space conditioning system including heating means having a stoker and mechanical circulating means for circulating heat exchange medium from said heating means to said space, the combination of, a thermostat electric control circuit including a thermostat for placing said stoker into operation upon demand for heat in said space and for normally placing the stoker out of operation when the demand for heat is satisfied, said electric control circuit also controlling said circulating means for causing it to operate at times when the stoker is in operation, a heater thermostat influenced by the temperature of the heating means including first and second switches and thermostatic actuating means therefor for actuating said switches in sequence upon rise in heater temperature, said first switch being connected to said circulating means and being shifted to running position upon rise in temperature of the heating means to a first value and said second switch being connected to said stoker and being shifted to off position upon rise in said temperature to a predetermined maximum value, fire maintaining means including a switch connected into said control circuit for operating said stoker independently of said thermostat to thereby maintain the fire alive, a manual operator associated with said heater thermostat and movable to a summer position wherein the first switch is maintained in running position and wherein the second switch is maintained in off position, and means operated by said manual operator upon movement to said summer position for preventing said fire maintaining means from influencing said control circuit.

4. In a control system for a space conditioning system including heating means having a stoker and mechanical circulating means for circulating heat exchange medium from said heating means to said space, the combination of, a relay having first and second positions and connected to said stoker and circulating means in a manner tending to place both into operation when the relay is in its first position and to place both out of operation when the relay is in its second position, a control circuit for said relay including a thermostat for causing said relay to assume its first position upon demand for heat in the space and for causing it to assume its second position when the demand for heat is satisfied, a summer switch connected in said control circuit for causing said relay to assume its first position, fire maintaining means including a switching mechanism connected to the control circuit in a manner causing said relay to assume its first position at times independently of said thermostat for maintaining the fire alive, a heater thermostat influenced by the temperature of the heating means including first and second switches and thermostatic actuating means therefor for actuating said switches in sequence upon rise in temperature of the heating means, said first switch being connected to said circulating means and being shifted to running position upon rise in temperature of the heating means to a first value and said second switch being connected to said stoker and being shifted to off position upon rise in said temperature to a predetermined maximum value, a manual operator associated with said heater thermostat and movable to a summer position wherein the first switch is maintained in running position and wherein the second switch is maintained in off position, and means including switching means operated by said manual operator upon movement to summer position for preventing said fire maintaining means from influencing said control circuit.

5. In a control system for a space conditioning system including heating means having a stoker and mechanical circulating means for circulating heat exchange medium from said heating means to said space, the combination of, a relay having first and second positions and connected to said stoker and circulating means in a manner tending to place both into operation when the relay is in its first position and to place both out of operation when the relay is in its second position, a control circuit for said relay including a thermostat for causing said relay to assume its first position upon demand for heat in the space and for causing it to assume its second position when the demand for heat is satisfied, a manual switch connected into said control circuit in series relationship with said thermostat for providing summer control of the circulating means, fire maintaining means including switching mechanism connected to the relay control circuit in parallel relationship with the thermostat for causing said relay to assume its first position at times independently of the thermostat for thereby maintaining the fire alive, a heater thermostat influenced by the temperature of the heating means including first and second switches and thermostatic actuating means therefor for actuating said switches in sequence upon rise in temperature of the heating means, said first switch being connected to said circulating means and being shifted to running position upon rise in said temperature to a first value and said second switch being connected to said stoker and being shifted to off position upon rise in said temperature to a predetermined maximum value, a manual operator associated with said heater thermostat and movable to a summer position wherein the first switch is maintained in running position and wherein the second switch is maintained in off position, and means including a switch closed by said manual operator upon movement to summer position and connected into parallel relationship with the first mentioned thermostat and said fire maintaining means for placing said manual switch in control of said circulating means.

6. In a control system for a space conditioning system including heating means having a stoker and mechanical circulating means for circulating heat exchange medium from said heating means to said space, the combination of, a thermostat electric control circuit including a thermostat for placing said stoker into operation upon demand for heat in said space and for normally placing the stoker out of operation when the demand for heat is satisfied, said electric control circuit also controlling said circulating means for causing it to operate at times when the stoker is in operation, a normally closed summer switch connected into said control circuit in series relationship with said thermostat, fire maintaining means including a switch connected into said control circuit in parallel relationship with said thermostat for operating said stoker independently of said thermostat to thereby maintain the fire alive, a summer-winter changeover means for preventing said control circuit from placing the stoker in operation, said summer changeover means including a switch connected into said control circuit in parallel relationship with said thermostat and said fire maintaining means and closed in summer for placing said summer switch in control of said circulating means.

7. In a control system for a space conditioning system including heating means having a stoker and mechanical circulating means for circulating heat exchange medium from said heating means to said space, the combination of, a relay having first and second positions and connected to said stoker and circulating means in a manner tending to place both into operation when the relay is in its first position and to place both out of operation when the relay is in its second position, a control circuit for said relay including a thermostat for causing said relay to assume its first position upon demand for heat in the space and for causing it to assume its second position when the demand for heat is satisfied, a summer switch connected in said control circuit in parallel relationship with said thermostat for causing said relay to assume its first position; fire maintaining means including a switching mechanism connected to the relay control circuit in parallel relationship with said thermostat for causing the relay to assume its second position independently of said thermostat to thereby maintain the fire alive, a heater thermostat influenced by the temperature of the heating means including first and second switches and thermostatic actuating means therefor for actuating said switches in sequence upon rise in temperature of the heating means, said first switch being connected to said circulating means and being shifted to running position upon rise in temperature of the heating means to a first value and said second switch being connected to said stoker and being shifted to off position upon rise in said temperature to a predetermined maximum value, a manual operator associated with said heater thermostat and movable to a summer position wherein the first switch is maintained in running position and wherein the second switch is maintained in off position, and means including a switch moved to open position upon movement of said manual operator to summer position, said switch being connected in series relationship with the switching mechanism of the fire maintaining means for preventing the fire maintaining means from causing operation of the circulating means.

8. In a control system for a space conditioning system including heating means having a stoker and mechanical circulating means for circulating heat exchange medium from said heating means to said space, the combination of, a thermostat electric control circuit including a thermostat for placing said stoker into operation upon demand for heat in said space and for normally placing the stoker out of operation when the demand for heat is satisfied, said electric control circuit also controlling said circulating means for causing it to operate at times when the stoker is in operation, a normally open summer switch connected in parallel relationship with said thermostat, fire maintaining means including a switch connected in said control circuit in parallel relationship with said thermostat for operating said stoker independently of said thermostat to thereby maintain the fire alive, changeover means operative in its summer position to prevent the control circuit from placing the stoker in operation whereby only the circulating means may be controlled by said summer switch, said summer-winter changeover means also including a switch in series relationship with said fire maintaining means for preventing said fire maintaining means from closing said control circuit.

9. In a control system for a space conditioning system including heating means having a stoker and mechanical circulating means for circulating heat exchange medium from the heating means to the space, the combination of, a relay having first and second positions, a control circuit for the relay including a space thermostat for causing the relay to assume its first position upon demand for heat in the space and to assume its second position when the demand for heat is satisfied, a heater thermostat including a switch which opens when the temperature of the heating means is relatively low and which closes when said temperature rises to a higher value, circuit means for energizing the circulating means through the first position of the relay and the heater thermostat, selective means for said circuit means operative in one position to place the relay and heater thermostat in conjoint control of the circulating means and operative in another position to place the heater thermostat in control of the circulating means independently of the relay, fire maintaining means for controlling said relay to cause said relay to assume its first position at times independently of said thermostat, and summer-winter changeover means arranged when in its winter position to place the relay in control of the stoker, said changeover means when in its summer position preventing the relay from placing the stoker in operation; rendering the relay in its first position capable of operating the circulating means irrespective of heater temperature and irrespective of the position of selective means; and rendering the fire maintaining means incapable of causing the relay to assume its first position.

10. In a control system for a space conditioning system including heating means having a stoker and mechanical circulating means for circulating heat exchange medium from the heating means to the space, the combination of, a relay having first and second positions, a control circuit for the relay including a space thermostat for causing the relay to assume its first position upon demand for heat in the space and to assume its second position when the demand for heat is satisfied, circuit means including a heater thermostat arranged to place the circulating means in operation when the temperature of the heating means rises to a predetermined value, fire maintaining means for controlling the relay independently of the space thermostat to cause said relay to assume its first position at times independently of said thermostat, and summer-winter changeover means arranged when in its winter position to render the relay capable of operating the stoker when the relay assumes its first position, said changeover means when in its summer position rendering the relay capable of causing operation of the circulating means when the relay assumes its first position; preventing the relay from operating the stoker; and preventing the fire maintaining means from controlling the relay.

11. In a control system for a space conditioning system including heating means having a stoker and mechanical circulating means for circulating heat exchange medium from the heating means to the space, the combination of, a relay having first and second positions, circuit means connecting the relay and stoker for causing operation of the stoker when the relay is in its first position, a control circuit for the relay including a space thermostat for causing the relay to assume its first position upon demand for heat in the space and to assume its second position when the demand for heat is satisfied, fire maintaining means for controlling the stoker to cause operation of the stoker at times independently of the space thermostat to thereby maintain the fire alive, circuit means including a heater thermostat arranged to place the circulating means in operation when the temperature of the heating means rises to a predetermined value, and summer-winter changeover means arranged when in its winter position to place the stoker under the control of said relay, said changeover means when in its summer position rendering the relay capable of causing operation of the circulating means when the relay assumes its first position; preventing the relay from operating the stoker; and preventing the fire maintaining means from causing operation of the circulating means.

12. In a control system for a space conditioning system including heating means having combustion means and mechanical circulating means for circulating heat exchange medium from the heating means to the space, the combination of, a relay having first and second positions, a control circuit for the relay including a space thermostat for causing the relay to assume its first position upon demand for heat and to assume its second position when the demand for heat is satisfied, a heater thermostat including a switch which opens when the temperature of the heating means is relatively low and which closes when said temperature rises to a higher value, circuit means for energizing the circulating means through the first position of the relay and the heater thermostat, selective means for said circuit means operative in one position to place the relay and heater thermostat in conjoint control of the circulating means and operative in another position to place the heater thermostat in control of the circulating means independently of the relay, and summer-winter changeover means arranged when in its winter position to place the relay in control of the combustion means, said changeover means when in its summer position preventing the relay from placing the combustion means in operation and rendering the relay in its first position capable of operating the circulating means irrespective of said selective means.

JUSTIN A. DEUBEL.
WAYLAND R. MILLER.